US008308954B2

(12) United States Patent
Ginosar et al.

(10) Patent No.: US 8,308,954 B2
(45) Date of Patent: Nov. 13, 2012

(54) METHODS FOR RECOVERING A POLAR SOLVENT FROM A FLUID STREAM CONTAMINATED WITH AT LEAST ONE POLAR IMPURITY

(75) Inventors: Daniel M. Ginosar, Idaho Falls, ID (US); Daniel S. Wendt, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 862 days.

(21) Appl. No.: 12/238,225

(22) Filed: Sep. 25, 2008

(65) Prior Publication Data
US 2010/0072132 A1     Mar. 25, 2010

(51) Int. Cl.
*B01D 11/00*     (2006.01)
(52) U.S. Cl. ........ 210/639; 210/634; 210/774; 210/806; 210/808; 554/8; 554/21
(58) Field of Classification Search .................. 210/634, 210/639, 774, 806, 808; 554/8–12, 20, 21, 554/169–174; 435/134; 426/417, 425, 429; 134/10, 26
See application file for complete search history.

(56) References Cited

U.S. PATENT DOCUMENTS

| | | |
|---|---|---|
| 3,436,344 A | 4/1969 | Canning et al. |
| 4,164,506 A | 8/1979 | Kawahara et al. |
| 4,466,923 A | 8/1984 | Friedrich |
| 4,695,411 A | 9/1987 | Stern et al. |
| 4,698,186 A | 10/1987 | Jeromin et al. |
| 4,792,418 A | 12/1988 | Rubin et al. |
| 4,839,287 A | 6/1989 | Holmberg et al. |
| 5,124,026 A | 6/1992 | Taylor et al. |
| 5,219,744 A | 6/1993 | Kurashige et al. |
| 5,242,578 A | 9/1993 | Taylor et al. |
| 5,288,619 A | 2/1994 | Brown et al. |
| 5,302,747 A | 4/1994 | Nelson et al. |
| 5,424,466 A | 6/1995 | Stern et al. |

(Continued)

FOREIGN PATENT DOCUMENTS
EP     1 061 120 A1     12/2000
(Continued)

OTHER PUBLICATIONS

Supplementary European Search Report for EP 06 75 8403, dated Apr. 7, 2010, 5 pages.

(Continued)

*Primary Examiner* — Joseph Drodge
(74) *Attorney, Agent, or Firm* — TraskBritt

(57) ABSTRACT

A method of removing a polar solvent from a fluid volume contaminated with at least one polar impurity, such as a free fatty acid, is provided. The method comprises providing a fluid volume that includes at least one polar impurity dissolved in at least one solvent. The fluid volume is contacted with an expanding gas to remove the at least one solvent. The expanding gas may be dissolved into the at least one solvent in the fluid volume to form a gas-expanded solvent. The immiscibility of the polar impurities in the gas-expanded solvent enables separation of the polar impurities from the gas-expanded solvent. After separation of the polar impurities, at least one of the temperature and pressure may be reduced to separate the solvent from the expanding gas such that the clean solvent may be reused.

6 Claims, 6 Drawing Sheets

U.S. PATENT DOCUMENTS

| | | | |
|---|---|---|---|
| 5,424,467 A | 6/1995 | Bam et al. | |
| 5,480,787 A | 1/1996 | Negishi et al. | |
| 5,481,058 A | 1/1996 | Blackwell et al. | |
| 5,520,708 A | 5/1996 | Johnson et al. | |
| 5,525,126 A | 6/1996 | Basu et al. | |
| 5,578,090 A | 11/1996 | Bradin | |
| 5,599,358 A | 2/1997 | Giavazzi et al. | |
| 5,697,986 A | 12/1997 | Haas | |
| 5,713,965 A | 2/1998 | Foglia et al. | |
| 5,759,549 A | 6/1998 | Hiltunen et al. | |
| 5,783,243 A | 7/1998 | Benado | |
| 6,106,720 A * | 8/2000 | Kanel et al. | 210/634 |
| 6,201,144 B1 | 3/2001 | Isbell et al. | |
| 6,211,390 B1 | 4/2001 | Peter et al. | |
| 6,288,251 B1 | 9/2001 | Tsuto et al. | |
| 6,294,194 B1 * | 9/2001 | Horhota et al. | 424/456 |
| 6,399,800 B1 | 6/2002 | Haas et al. | |
| 6,524,469 B1 | 2/2003 | Schucker | |
| 6,537,787 B1 | 3/2003 | Breton | |
| 6,570,030 B2 | 5/2003 | Goto et al. | |
| 6,712,867 B1 | 3/2004 | Boocock | |
| 6,800,316 B1 | 10/2004 | Perrut et al. | |
| 6,884,900 B2 | 4/2005 | Maeda et al. | |
| 6,887,283 B1 | 5/2005 | Ginosar et al. | |
| 6,938,439 B2 * | 9/2005 | Wikstrom et al. | 62/606 |
| 7,478,542 B2 * | 1/2009 | Wikstrom et al. | 62/606 |
| 7,514,575 B2 * | 4/2009 | Ginosar et al. | 554/169 |
| 7,691,270 B2 * | 4/2010 | Ginosar et al. | 210/634 |
| 7,772,414 B1 * | 8/2010 | Hybertson et al. | 554/169 |
| 7,842,653 B2 * | 11/2010 | Darbha et al. | 508/491 |
| 2004/0087809 A1 | 5/2004 | Nakayama et al. | |
| 2006/0035350 A1 * | 2/2006 | Catchpole et al. | 435/134 |
| 2006/0252950 A1 | 11/2006 | Ginosar et al. | |
| 2007/0012621 A1 | 1/2007 | Ginosar et al. | |
| 2007/0282119 A1 | 12/2007 | Matson et al. | |
| 2009/0178693 A1 * | 7/2009 | Turner et al. | 134/10 |

FOREIGN PATENT DOCUMENTS

| | | |
|---|---|---|
| JP | 63-112536 | 5/1988 |
| JP | 07-062385 | 3/1995 |
| JP | 09-157684 | 12/1995 |
| JP | 2000-270886 | 3/1999 |
| WO | 00/05327 | 2/2000 |
| WO | 00/05327 A1 | 2/2000 |
| WO | 03/089399 | 10/2003 |
| WO | 2007/032791 | 3/2007 |

OTHER PUBLICATIONS

Yahya et al., "Ester Synthesis in Lipase-catalyzed Reactions," Enzyme and Microbial Technology, vol. 23, Nos. 7-8, pp. 438-450, Dec. 15, 1998.
Yoon et al., "Transesterification between Triolein and Ethylbehenate by Immobilized Lipase in Supercritical Carbon Dioxide," Journal of Fermentation and Bioengineering, vol. 82, No. 4, 334-340, Jun. 1996.
Yu et al., "Enzymatic Esterification of Fatty Acid Mixtures from Milk Fat and Anhydrous Milk Fat with Canola Oil in Supercritical Carbon Dioxide," Biotechnology Progress, 1992, vol. 8 No. 6, 508-513.
Yu et al., "Enzymatic Reaction in Supercritical Fluid Carbon Dioxide Using Dry-Ice," Journal of the Chinese Chemical Society, vol. 46, No. 5, pp. 647-650, Oct. 1999.
International Search Report dated Nov. 4, 1999 (2 pages).
Bernard et al., "Internal Mass Transfer Limitation During Enzymatic Esterification in Supercritical Carbon Dioxide and Hexane, Biocatalysis and Biotransformation," vol. 12, (1995) pp. 299-308.
Cernia et al. "The Role of the Reaction Medium in Lipase-catalyzed Esterifications and Transesterifications," Chemistry and Physics of Lipids, vol. 93, Nos. 1-2, pp. 157-168, Jun. 1998.
Cernia et al., "Lipases in Supercritical Fluids," Lipases PT B Methods in Enzymology, vol. 286, pp. 495-508 (1997).
Chi et al., "Enzymatic Interesterification in Supercritical Carbon-dioxide," Agricultural and Biological Chemistry, vol. 52, No. 6, pp. 1541-1550, Jun. 1988.
Colombie et al., "Water Activity Control: A Way to Improve the Efficiency of Continuous Lipase Esterification," Biotechnology and Bioengineering, vol. 60, No. 3, pp. 362-368, Nov. 5, 1998.
Demirbas, Ayhan, "Biodiesel from vegetable oils via transesterification in supercritical methanol," Energy Conversion and Management 43 (2002) 2349-2356.
Demirbas, Ayhan, "Biodiesel fuels from vegetable oils via catalytic and non-catalytic supercritical alcohol transesterifications and other methods: a survey," Energy Conversion and Management 44 (2003) 2093-2109.
Dumont et al., "Continuous Synthesis of Ethyl Myristate by Enzymatic Reaction in Supercritical Carbon Dioxide," Journal of Supercritical Fluids, vol. 6, No. 2, pp. 85-89, Jun. 1993.
Fangrui et al., "Biodiesel Production: A Review," Bioresource Technology, vol. 70, No. 1, pp. 1-15, Oct. 1999.
Fukuda et al., "Biodiesel Fuel Production by Transesterification of Oils," Journal of Bioscience and Bioengineering, vol. 92, No. 5, 405-416, 2001.
Gunnlaugsdottir et al., "Alcoholysis and Glyceride Synthesis with Immobilized Lipase on Controlled-pore Glass of Varying Hydrophobicity in Supercritical Carbon Dioxide," Enzyme and Microbial Technology, vol. 22, No. 5, pp. 360-367, Apr. 1998.
Gunnlaugsdottir et al., "Lipase-Catalyzed Alcoholysis with Supercritical Carbon Dioxide Extraction 2: Phase Behavior," Journal of the American Oil Chemists Society, vol. 74, No. 11, pp. 1491-1494, Nov. 1997.
Gunnlaugsdottir et al., "Process Parameters Influencing Ethanolysis of Cod Liver Oil in Supercritical Carbon Dioxide," Journal of Supercritical Fluids, vol. 12, No. 1, pp. 85-93, Mar. 15, 1998.
Habulin et al., "Synthesis of Oleic Acid Esters Catalyzed by Immobilized Lipase," Journal of Agricultural and Food Chemistry, vol. 44, No. 1, pp. 338-342, Jan. 1996.
Hrnjez et al. "Enzymatic Esterification of 1,2-Butanediol and 1,3 Butanediol in Supercritical Carbon-dioxide Reaction Rate, Regioselectivity, and Stereoselectivity as a Function of Pressure," Abstracts of Papers of the American Chemical Society 207:315-ORGN, Part 2 Mar. 13, 1994.
Hyatt, John A., "Liquid and Supercritical Carbon Dioxide as Organic Solvents," Journal of Organic Chemistry, vol. 49, No. 26, pp. 5097-5101, 1984.
Ikariya et al., "Chemical Reactions in Supercritical Fluids," Journal of Synthetic Organic Chemistry Japan, vol. 53, No. 5, pp. 358-369, May 1995.
Ikushima et al., Promotion of a Lipase-Catalyzed Esterification in Supercritical Carbon Dioxide in the Near-Critical Region, Chemical Engineering Science vol. 51, No. 11, pp. 2817-2822, Jun. 1996.
Ikushima et al., "Promotion of Lipase-catalyzed Esterification of N-Valeric Acid and Citronellol in Supercritical Carbon Dioxide in the Near-critical Region," Journal of Chemical Engineering of Japan, vol. 29, No. 3, pp. 551-553, Jun. 1996.
Ikushima, Yutaka, "Supercritical Fluids: An Interesting Medium for Chemical and Biochemical Processes, Advances in Colloid and Interface Science," vol. 71-71, 259-280, Sep. 1, 1997.
Jackson, et al., "Methanolysis of Seed Oils in Flowing Supercritical Dioxide," Journal of the American Oil Chemists Society, vol. 73, No. 3 (1996).
Kiran et al. "Supercritical Fluid Engineering Science Fundamentals and Applications," pp. 200-219.
Knez et al, "Enzymatic Synthesis of Oleyl Oleate in Dense Fluids," Journal of the American Oil Chemists Society, vol. 72, No. 11, Nov. 1995, pp. 1345-1349.
Knez et al., "Enzyme Catalyzed Reactions in Dense Gases," vol. 14, No. 1, pp. 17-29, Oct. 1, 1998.
Knez et al., Lipase Catalysed Esterification At High Pressure, Biotechnology and Bioengineering, vol. 9, (1994) pp. 115-121.
Krmelj et al., "Lipase-catalyzed synthesis of Oleyl Oleate in Pressurized and Supercritical Solvents," FETT-LIPID, vol. 101, No. 1, pp. 34-38, Jan. 1999.
Kusdiana et al., "Kinetics of transesterification in rapeseed oil to biodiesel fuel as treated in supercritical methanol," Fuel 80 (2001) 693-698.
Lopez-Belmonte et al., "Enantioselective Esterification of 2-Arylpropionic Acids Catalyzed by Immobilized *Rhizomucor miehei* Lipase," Journal of Organic Chemistry, vol. 62, No. 6, pp. 1831-1840, Mar. 21, 1997.

March, Jerry, "Advanced Organic Chemistry, Reactions, Mechanisms, and Structure," 4th Edition, John Wiley & Sons, 1992, pp. 393-396.

Marty et al., "Comparison of Lipase-catalysed Esterification in Supercritical Carbon Dioxide and in n-Hexane," Biotechnology Letters, vol. 12, No. 1, pp. 11-16, Jan. 1990.

Marty et al., "Continuous Reaction-Separation Process for Enzymatic Esterification in Supercritical Carbon Dioxide," Biotechnology and Bioengineering, vol. 43, No. 6, pp. 497-504, Mar. 15, 1994.

Marty et al., "Kinetics of Lipase-Catalyzed Esterification in Supercritical CO2," Biotechnology and Bioengineering, vol. 39, pp. 273-280 (1992).

McDaniel et al., "Esterification of Decanoic Acid During Supercritical Fluid Extraction Employing Either Methanol-modified Carbon Dioxide or a Methanol Trap," Journal of Chromatography, vol. 858, No. 2, pp. 201-207, Oct. 15, 1999.

Mensah et al., "Adsorptive Control of Water in Esterification with Immobilized Enzymes: I. Batch Reactor Behavior," Biotechnology and Bioengineering, vol. 60, No. 4, pp. 434-444, Nov. 20, 1998.

Mesiano et al., Chemical Reviews, vol. 99, No. 2, pp. 623-633, Feb. 1999.

Michor et al., "Enzymatic Catalysis in Supercritical Carbon Dioxide: Comparison of Different Lipases and a Novel Esterase," Biotechnology Letters, vol. 18, No. 1, pp. 79-84, Jan. 1996.

Mori et al., "Biocatalytic Esterification in Supercritical Carbon Dioxide by Using a Lipid-coated Lipase," Chemistry Letters, vol. 9, 921-922, Sep. 1998.

Murakata et al., "Esterification Activity of Lipasse Entrapped in Reverse Micelles Formed in Liquefied Gas," Journal of Chemical Engineering of Japan, vol. 29, No. 2, pp. 277-281, Apr. 1996.

Nilsson et al., "Solubilities of Mehtyl Oleate, Oleic Acid, Oleyl Glycerols, and Oleyl Glycerol Mixtures in Supercritical Carbon Dioxide," Journal of the American Oil Chemists Society, JAOCS, vol. 68, No. 2, Feb. 1991, pp. 87-91.

Pasta et al., "Subtilisin-catalyzed Transesterification in Supercritical Carbon Dioxide," Biotechnology Letters, vol. 11, No. 9, pp. 643-648 (1989).

Saka et al., "Biodiesel fuel from rapeseed oil as prepared in supercritical methanol," Fuel 80 (2001) 225-231.

Sarkari et al., "Enzymatic Catalysis in Cosolvent Modified Pressurized Organic Solvents," Biotechnology and Bioengineering, vol. 65, No. 3, pp. 258-264, Nov. 5, 1999.

Savage et al., "Reactions at Supercritical Conditions: Applications and Fundamentals," Aiche Journal, vol. 41, No. 7, pp. 1723-1778, Jul. 1995.

Stamatis et al, "Studies on the Enzymatic Synthesis of Sugar Esters in Organic Medium and Supercritical Carbon Dioxide," Chemical and Biochemical Engineering Quarterly, vol. 12, No. 3, pp. 151-156, Sep. 1998.

Stransky et al., "Simple Quantitative Transesterification of Lipids," FETT-LIPID, vol. 98, No. 2, 65-71, Feb. 1996.

Subramaniam et al., "Reactions in Supercritical Fluids—A Review," Industrial & Engineering Chemistry Process Design and Development, vol. 25, No. 1, 1-12, Jan. 1986.

Vieville et al, "Esterification of Oleic Acid by Methanol Catalyzed by p-Toluenesulfonic Acid and the Cation-Exchange Resins K2411 and K1481 in Supercritical Carbon Dioxide," Industrial & Engineering Chemistry Research, vol. 32, No. 9, pp. 2065-2068, Sep. 1993.

Vija et al, "Lipase-catalysed Esterification in Supercritical Carbon Dioxide and in Hexane," Bioorganic & Medicinal Chemistry Letters, vol. 7, No. 3, pp. 259-262, 1997.

Wu et al., "Enhancement of Enantioselectivity by Altering Alcohol Concentration for Esterification in Supercritical CO2," Journal of Chemical Engineering of Japan, vol. 32, No. 3, pp. 338-340, Jun. 1999.

PCT International Search Report and Written Opinion of the International Searching Authority for PCT/US09/57188, dated Nov. 30, 2009, 8 pages.

* cited by examiner

METHODS FOR RECOVERING A POLAR SOLVENT FROM A FLUID STREAM CONTAMINATED WITH AT LEAST ONE POLAR IMPURITY

GOVERNMENT RIGHTS

This invention was made with government support under Contract Number DE-AC07-05ID 14517 awarded by the United States Department of Energy. The government has certain rights in the invention.

CROSS-REFERENCE TO RELATED APPLICATIONS

The subject matter of this application is related to the subject matter of U.S. patent application Ser. No. 09/554,708, filed Jul. 31, 2000, now U.S. Pat. No. 6,887,283, issued May 3, 2005; U.S. patent application Ser. No. 11/123,607, filed May 6, 2005, now U.S. Pat. No. 7,514,575, issued Apr. 7, 2009; and U.S. patent application Ser. No. 11/181,211, filed Jul. 13, 2005, now U.S. Pat. No. 7,691,270, issued Apr. 6, 2010. The subject matter of the present application is also related to U.S. application Ser. No. 13/177,962, filed Jul. 7, 2011, pending.

TECHNICAL FIELD

The present invention relates to a method of recovering a polar solvent contaminated with at least one polar impurity, such as a free fatty acid. More specifically, embodiments of the present invention relate to recovering the polar solvent using an expanding gas.

BACKGROUND

Biodiesel has been the subject of much investigation as an alternative for petroleum diesel fuel. As used herein, the term "biodiesel" refers to an ester-based fuel oxygenate that is derived from a biological source. The biodiesel fuel is used as an alternative for, or as an additive to, petroleum diesel fuel in automobiles or other vehicles. The biodiesel fuel is conventionally produced from a triglyceride starting material or a fatty acid starting material by a transesterification reaction or an esterification reaction, respectively. Generally, the triglyceride is reacted, or transesterified, with an alcohol to produce glycerol (also known as glycerin) and a corresponding alkyl ester of the triglyceride. Similarly, the fatty acid is reacted, or esterified, with an alcohol to produce a corresponding alkyl ester of the fatty acid. The triglyceride or fatty acid feedstock materials are available from various sources, such as from pure or used fats or oils. These fats or oils are typically hydrophobic and water-insoluble. In addition to including the triglyceride or fatty acid, the fats or oils include free fatty acids, phospholipids, sterols, water, dirt, detergents, polar compounds, or other impurities. These sources of the fats or oils are too viscous and their freezing points too high to be used directly as the biodiesel fuel and, therefore, the triglycerides or fatty acids are transesterified or esterified to produce the corresponding alkyl ester, which has a lower viscosity than that of the source of the feedstock material. The transesterification of the triglyceride (or the esterification of the fatty acid) is conducted with an excess of the alcohol in the presence of a catalyst. As the reaction proceeds, two phases form. One phase includes the alkyl ester and the other phase includes the glycerol. The two phases are allowed sufficient time to settle before additional processing is conducted to purify the alkyl ester from the glycerol.

Currently, most biodiesel is made from soybean oil, methanol, and an alkaline catalyst. However, there are large amounts of waste fats and oils that are unsuitable for human consumption that could be converted to biodiesel at lower cost. The problem with processing these waste oils is that they often contain large amounts of free fatty acids that cannot be converted to biodiesel using an alkaline catalyst. These free fatty acids react with the alkaline catalyst to produce soaps that inhibit the separation of the biodiesel, glycerin, and wash water. An acid-catalyzed pretreatment with an alcohol, such as methanol, has been used to convert these high free fatty acid feedstocks to methyl esters that do not form soaps. However, this pretreatment leaves behind acid and water that interferes with the alkaline transesterification. The free fatty acids could first be extracted using a solvent, such as an alcohol, and the purified triglyceride would then undergo base-catalyzed transesterification. The fatty acid could be recovered from the solvent and then be esterified using an acid catalyst and methanol to produce the alkyl ester, sold, or simply discarded. Additionally, in some cases, the biodiesel product contains unreacted free fatty acids, which cause the product to be off spec. Again, these free fatty acids can be extracted using a solvent such as an alcohol.

Further, in food and chemical processes, some fats and oils need to have impurities such as, for example, free fatty acids, sugars, and non-oil lipids, removed to improve their quality. This too can be accomplished by extracting the impurities with a solvent, such as an alcohol. The extraction process results in the formation of a waste product including the solvent contaminated with the impurities removed from the fat or oil.

Removing the free fatty acids from a fat or oil results in additional complexity of recovering and recycling the solvent, which has proven to be problematic. Particularly, the solvent, is typically removed by distillation, evaporization, lyophilization, use of an inert gas, or use of a drying agent, such as a molecular sieve.

Because these conventional techniques consume considerable amounts of energy or use expensive and toxic compounds, efficient methods of recovering a solvent used to extract polar impurities, such as free fatty acids and water, from fat, oil, or other feedstock stream are desired.

BRIEF SUMMARY OF THE INVENTION

According to an embodiment, a method of recovering a polar solvent from a fluid volume is provided. The method may include extracting at least one polar impurity, such as a free fatty acid, from a feedstock volume into the polar solvent to form a fluid volume that includes the polar solvent and the at least one polar impurity. The fluid volume may be subjected to an expanding gas at a pressure at or near a critical point thereof such that polar solvent may become less polar, thus separating from the polar impurity, such as the at least one polar impurity. After the at least one polar impurity has been removed or separated, the pressure of the expanding gas may be modified to recover the polar solvent.

According to another embodiment, a method of removing at least one polar impurity from at least one polar solvent is provided. A fluid stream including at least one polar solvent and the at least one polar impurity, may be contacted with an expanding gas at or near a critical point thereof to form two substantially immiscible phases. The two substantially immiscible phases may be separated from one another by conventional techniques. After separation of phases, at least one of the temperature and pressure of the expanding gas may be modified such that the solvent separates from the expanding gas.

According to yet another embodiment, a method of recovering a polar solvent from a fluid volume, including methanol and at least one polar impurity, by exposing it to carbon dioxide is provided. At least one of a temperature and a pressure may be increased to form a gas-expanded solvent including the methanol and the carbon dioxide and a liquid phase including the polar impurity. The liquid phase may be removed from the gas-expanded solvent and the pressure of the gas-expanded solvent may be reduced by between about 20 psi to about 30 psi to separate the gas-expanded solvent into methanol and carbon dioxide.

According to another embodiment, a method of removing a polar impurity from a polar solvent is provided. The method may include contacting a fluid volume including the polar impurity and the polar solvent with carbon dioxide and adjusting at least one of a pressure and a temperature to greater than or equal to a critical point of the expanding gas to form one phase including the at least polar impurity and another phase including the solvent and the carbon dioxide. For example, the pressure may be increased to a range of from about 1110 psi to about 1117 psi and a temperature in the range of from about 30° C. to about 40° C. to form a liquid phase and another phase including methanol and the carbon dioxide.

DETAILED DESCRIPTION OF THE INVENTION

Figure 1:
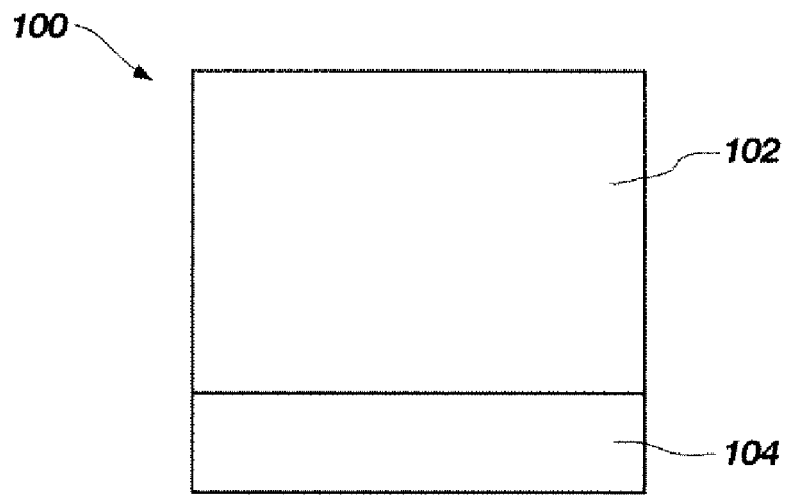
FIGS. 1-4 are schematic illustrations of an embodiment of a method for recovering a solvent contaminated with a polar impurity.

An expanding gas may be used to recover a polar solvent from a fluid volume contaminated with at least one polar impurity, such as a free fatty acid. As used herein, the term "expanding gas" means and includes a gas, liquid, or supercritical fluid capable of dissolving into a solvent at which point a volume occupied by the solvent increases. The expanding gas may alter the solubility of the polar impurity in the polar solvent, enabling recovery of the polar solvent. Recovering the polar solvent from the fluid volume using the expanding gas enables recycling of the polar solvent for use in the extraction of at least one polar impurity from, for example, high free fatty acid oils. While the fluid volume is described herein as a polar solvent contaminated with at least one polar impurity, such as at least one free fatty acid, produced as a product of the extraction process in biodiesel production, the expanding gas may be used to remove impurities from other impurity-containing feedstock volumes or product volumes. For instance, the expanding gas may be used to recover a polar solvent from an impurity-containing feedstock volume or product volume in the oil refining industry.

Biodiesel produced by the transesterification or esterification reaction may be an alkyl ester or mixtures thereof. An alkyl ester of a glyceride may be produced by a transesterification reaction in which an alcohol is reacted with a glyceride. Alternatively, an alkyl ester of a fatty acid may be produced by an esterification reaction in which an alcohol is reacted with a fatty acid. The chemical reaction for producing the alkyl ester from a glyceride is shown in Equation 1:

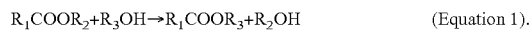

$$R_1COOR_2 + R_3OH \rightarrow R_1COOR_3 + R_2OH \qquad \text{(Equation 1)}.$$

In the reaction, the organic ester, $R_1COOR_2$, is reacted with the alcohol, $R_3OH$, to produce the organic ester, $R_1COOR_3$, and the alcohol, $R_2OH$. $R_1$ may be an aliphatic hydrocarbon chain having from four to thirty-six carbon atoms. $R_2$ may be glycerol or another aliphatic hydrocarbon chain having from four to thirty-six carbon atoms. $R_2$ is linked to $R_1$ through an ester ("COO⁻") linkage. $R_1COOR_2$ may be an acylglycerol, fat, oil, wax, or fatty acid. The acylglycerol may be mono-, di-, or tri-substituted including, but not limited to, a monoglyceride, diglyceride, or triglyceride. If $R_1COOR_2$ is a monoglyceride, diglyceride, triglyceride, fat, or oil, $R_1$ may be the aliphatic hydrocarbon ($C_4$ to $C_{36}$) chain and $R_2$ may be glycerol. If $R_1COOR_2$ is a fatty acid, $R_1$ may be the aliphatic hydrocarbon ($C_4$ to $C_{36}$) chain and $R_2$ may be hydrogen or a metal (i.e., $R_2$ is the salt of the fatty acid ($R_1COO^-M^+$)). $R_1COOR_2$ may also include a free fatty acid ($R_1COO^-$). If $R_1COOR_2$ is a wax, $R_1$ may be an aliphatic hydrocarbon chain linked to $R_2$ through the ester linkage. In one embodiment, $R_1COOR_2$ is a triglyceride, such as an animal fat, animal oil, vegetable fat, vegetable oil, or mixtures thereof. Specific examples of triglycerides include, but are not limited to, peanut oil, rapeseed oil, sesame oil, soybean oil, corn oil, sunflower oil, palm oil, palm kernel oil, coconut oil, safflower oil, olive oil, linseed oil, cotton seed oil, tung oil, castor oil, beef fat, pork fat, fish oil, rendered fat, or mixtures thereof. The triglyceride may also be obtained from waste edible oils, such as restaurant grease, household grease, waste industrial frying oil, or mixtures thereof. In another embodiment, $R_1COOR_2$ is a fatty acid, such as a saturated fatty acid, an unsaturated fatty acid, or mixtures thereof. By way of non-limiting example, fatty acids may include, but are not limited to, oleic acid, palmitic acid, stearic acid, linoleic acid, or mixtures thereof. $R_3$ may be a short-chain hydrocarbon group, which is attached to a hydroxyl group of the alcohol. $R_3$ may include, but is not limited to, a methyl, ethyl, propyl, or butyl group. The alcohol, $R_3OH$, may include, but is not limited to, methanol, ethanol, n-propanol, isopropanol, n-butanol, isobutanol, t-butanol, or mixtures thereof. The alcohol may be selected depending on the desired products of the reaction.

In the processing or refining of commercial oils, such as olive oil, corn oil, and soybean oil, impurities may be removed to reduce acidity and to provide improved aroma and flavor. Impurities such as free fatty acids, sugars, non-oil lipids, aflatoxin, and other components, may be extracted from the oil, for example, by a conventional liquid extraction process using an alcohol, such as ethanol.

The feedstock volume that is a source of the glyceride or fatty acid feedstock material may be a nonpolar liquid, such as a fat, oil, or mixtures thereof. The fat or oil may include, but is not limited to, an animal fat, animal oil, vegetable fat, vegetable oil, or mixtures thereof, such as rapeseed oil, sesame oil, soybean oil, corn oil, sunflower oil, peanut oil, palm oil, palm kernel oil, coconut oil, safflower oil, olive oil, linseed oil, cotton seed oil, tung oil, castor oil, beef fat, pork fat, chicken fat, fish oil, rendered fat, or mixtures thereof. The glyceride or fatty acid feedstock material may also be obtained from waste edible oils, such as restaurant grease, household grease, waste industrial frying oil, or mixtures thereof. In addition to the glyceride or fatty acid feedstock material, the feedstock volume may include other polar impurities, such as free fatty acids, phospholipids, sterols, water, dirt, detergents, or mixtures thereof. As a non-limiting example, the feedstock volume may include greater than or equal to about 5% by weight of free fatty acids, which are dispersed, dissolved, or emulsified in the feedstock volume. Conventional yellow grease may include greater than about 9% by weight free fatty acids, while conventional brown grease may include greater than about 25% by weight free fatty acids.

Polar impurities, such as free fatty acids, may be removed from the feedstock volume with a polar solvent, for example, before using the feedstock volume in the transesterification reaction to convert triglycerides to alkyl esters, or during processing of feedstock to produce commercially available oil. As a non-limiting example, the polar solvent may be methanol, ethanol, n-propanol, isopropanol, n-butanol, isobutanol, t-butanol, or mixtures thereof. The polar solvent may be selected such that it has an affinity to attract polar impurities from the nonpolar components, such as triglycerides, fats, and oils, in the feedstock volume. Thus, the polar solvent extracts the polar impurity from the feedstock volume forming a fluid volume that includes the polar solvent and the polar impurity. The removal of the polar impurities facilitates separation of the nonpolar components in the feedstock volume, such as separation of fatty acids for transesterification to form alkyl esters useful in the production of biodiesel.

The polar impurities and polar solvent in the fluid volume may be separated by treatment with the expanding gas. While the specific embodiments herein describe removing polar impurities from the polar solvent, the expanding gas may be similarly used to separate other polar compounds, as would be recognized by one of ordinary skill in the art. The fluid volume may be treated to recover the polar solvent by contacting the fluid stream with the expanding gas. Prior to treatment with the expanding gas, the fluid volume may be maintained at ambient temperature and pressure. The expanding gas may be a solvent that includes, by way of non-limiting example, carbon dioxide, methane, ethane, propane, butane, pentane, isomers thereof (i.e., n-butane, isobutane, t-butane, n-pentane, isopentane, etc.), propylene, butylene, pentene, or mixtures thereof. The expanding gas may be in a gas phase, a liquid phase, a near critical liquid phase, or a supercritical phase as the expanding gas contacts the contaminated polar solvent. The expanding gas may be selected so that it has a critical phase that is obtainable under moderate temperature and pressure conditions. In other words, a critical temperature ("$T_c$") and a critical pressure ("$P_c$") of the expanding gas may be moderate, which enables recovery of the polar solvent using low amounts of energy. For instance, the $T_c$ may range from approximately −20° C. to approximately 250° C. and the $P_c$ may range from approximately 200 pounds per square inch ("psi") to approximately 5000 psi. As used herein, the term "psi" is defined as gauge pressure, or psig. The expanding gas may be maintained at or near its $T_c$ and $P_c$ (i.e., at or near a critical point of the expanding gas) to recover the polar solvent from the fluid volume including at least one polar impurity. For example, each of the temperature and pressure may be slightly below, at, or above the $T_c$ and $P_c$. The $T_c$ of the expanding gas is the temperature above which the expanding gas does not exhibit a distinct gas and liquid phase. The $P_c$ of the expanding gas is the minimum pressure needed to liquefy the expanding gas at a temperature incrementally below its $T_c$. If the expanding gas is heated to a temperature above the $T_c$ and pressurized to a pressure above the $P_c$, the expanding gas is in the supercritical phase and exhibits properties that are intermediate to those of a gas or a liquid. These properties include, but are not limited to, density, viscosity, surface tension, diffusivity, and solubility. The properties of the expanding gas in the supercritical phase may be different than the properties of the same solvent in either a liquid phase or a gas phase. For instance, in the supercritical phase, the expanding gas may exhibit a viscosity that is more similar to that of a gas and a density that is more similar to that of a liquid.

Due to its high density, low viscosity, and high diffusivity, the expanding gas may be used as a solvent or as a gas antisolvent. The expanding gas may function in either the solvent or gas antisolvent capacity depending on temperature and pressure conditions at which the expanding gas is used and the chemical nature of the solute. The concentration of the expanding gas may also affect whether the expanding gas functions as a solvent or gas antisolvent. In addition, the presence of a co-solvent(s) and its concentration may affect whether the expanding gas functions as a solvent or gas antisolvent. The expanding gas may also exhibit properties similar to its properties in the supercritical phase at temperatures and pressures that are near to the $T_c$ and the $P_c$. For instance, the temperature and pressure conditions may be slightly below each of the $T_c$ and $P_c$ as long as the expanding gas exhibits properties similar to those in the supercritical phase. As such, the term "expanding gas" as used herein also encompasses a near critical solvent having a temperature and pressure slightly below the $T_c$ and $P_c$.

With expanding gas maintained at or near its $T_c$ and $P_c$, as described above, the fluid volume and the expanding gas may be contacted, causing the expanding gas, such as carbon dioxide, to become substantially soluble in the polar solvent. As the fluid volume and the expanding gas come into contact, at least one of the temperature and pressure may be increased such that the expanding gas acts as a gas antisolvent. As the polar solvent volume increases by the expanding gas, a gas-expanded solvent may form that includes a mixture of the expanding gas and the polar solvent. As used herein, the term "gas-expanded solvent" means and includes a liquid in which a quantity of expanding gas is dissolved. The gas-expanded solvent may form at the interface of the expanding gas and the liquid phase. The gas-expanded solvent may be present in a liquid phase, a near critical liquid phase, or a supercritical phase. The gas-expanded solvent may begin to behave as a nonpolar solvent, such that the solubility of the polar impurities in the solvent is reduced causing the polar impurities to drop out of solution with the polar solvent, remaining in the fluid volume.

The gas-expanded solvent may become more nonpolar as at least one of the pressure and temperature is increased. By changing the solubility of the polar impurities in the solvent, two phases that are substantially immiscible may form. One of the phases may be a liquid phase that includes the polar impurities, while the other phase may include the expanding gas and the polar solvent. These two phases may subsequently be separated from one another by conventional techniques, such as by liquid-liquid separation, gas-liquid separation, gravity separation, or centrifugal separation. The liquid phase that includes the polar impurities may be heavier than the gas-expanded solvent, and may be easily separated or drained from the gas-expanded solvent. By way of non-limiting example, the polar impurities comprise at least one fatty acid and may be reacted with methanol in a separate, acid-catalyzed esterification reaction used for biodiesel production, while the polar solvent and the expanding gas may remain as a gas-expanded solvent.

After removing the liquid phase including the polar impurities, the polar solvent may be recovered by adjusting at least one of the pressure and temperature of the gas-expanded solvent such that the polar solvent and the expanding gas become substantially immiscible in one another. By decreasing at least one of the pressure and temperature of the gas-expanded solvent, the polar solvent drops out of the expanding gas as a liquid phase, while the expanding gas may exhibit a gas phase or as a non-polar liquid phase. These two phases may subsequently be separated from one another by conventional techniques, such as by liquid-gas separation, liquid-liquid separation, gravity separation, or centrifugal separation. For example, the liquid phase that includes the polar solvent may be heavier than the gas phase that includes the expanding gas. As such, the liquid phase may be easily separated or drained from the gas phase and collected to be reused in extracting free fatty acids from feedstock volumes.

The expanding gas and the contaminated polar solvent may be contacted in a vessel. The vessel may be a batch separator or a continuous separator, and be suitably configured as a flask, a hemispherical or cylindrical vessel, a pipe, a static mixer, or an agitation vessel, as known in the art. The vessel may comprise glass, steel, stainless steel, nickel alloys, titanium alloys, glass-lined steel, polymer-lined steel, ceramic-lined steel, or mixtures thereof. As a non-limiting example, the vessel may be a cell configured to provide a closed system such that the contents of the vessel may be heated or pressurized. For instance, the vessel may be heated using a heat exchanger extending to the interior of the vessel, or by heating the vessel externally. The vessel may include a stir bar used to stir the mixture during recovery of the polar solvent. The vessel may also include a port or other opening to allow for easy separation of the two immiscible phases. Accordingly, the term "volume" as used herein encompasses a defined, contained volume of fluid as well as a flowing stream of fluid.

As shown in FIG. 1, a fluid volume 104 may be introduced into a vessel 100 at an ambient temperature and pressure. By way of non-limiting example, the fluid volume 104 may be in the liquid phase and may include one or more polar impurities dissolved in a solvent. The solvent may be a polar solvent such as methanol, ethanol, n-propanol, isopropanol, n-butanol, isobutanol, t-butanol, or mixtures thereof. The polar impurities may include, for example, free fatty acids, phospholipids, sterols, water, dirt, detergents, polar compounds, or other impurities, and may be present in the fluid volume 104, for example, in a range of from about 5% by weight to about 60% by weight, more specifically, from about 9% by weight to about 30% by weight. The temperature of the fluid volume 104 may be increased in a range of from about 30° C. to about 40° C., more particularly about 31° C.

An expanding gas 102 may be introduced into the vessel 100 and contacted with the fluid volume 104. As a non-limiting example, the expanding gas may be carbon dioxide, methane, ethane, propane, butane, pentane, isomers thereof (i.e., n-butane, isobutane, t-butane, n-pentane, isopentane, etc.), ethylene, propylene, butylene, pentene, or mixtures thereof. The vessel 100 may be initially maintained at ambient temperature and pressure conditions such that the fluid volume 104 and the expanding gas 102 remain in separate, immiscible phases. At least one of the pressure and temperature within the vessel 100 may be increased such that the expanding gas 102 enters its liquid phase, near critical liquid phase, or supercritical phase. For example, the pressure within the vessel 100 may increase as the expanding gas 102 is introduced to the vessel 100 so that the expanding gas 102 is in its pressurized gas phase, near critical gas phase, or supercritical phase. An amount of expanding gas 102 sufficient to increase the pressure to greater than or equal to a critical pressure thereof may be introduced into the vessel 100. For example, the expanding gas 102 may be carbon dioxide and may be introduced to increase the pressure in the vessel 100 to at least about 1070 psi. As the pressure increases, the expanding gas 102 may dissolve into the solvent of the fluid volume 104.

Figure 2:
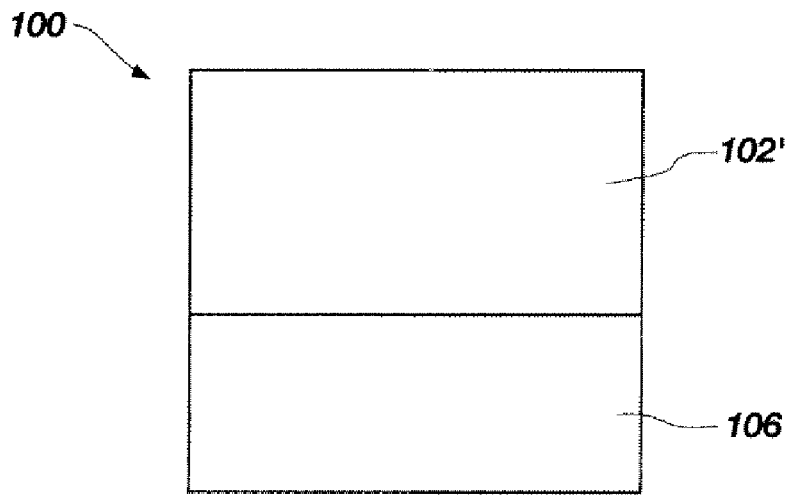

Referring to FIG. 2, as the pressure increases, the expanding gas 102' may dissolve into the solvent forming a gas-expanded solvent 106. The gas-expanded solvent 106 may include a mixture of the expanding gas 102', the solvent, and the one or more polar impurity and may be in its liquid phase, or near critical liquid phase. The expanding gas 102' may be continuously introduced into the vessel 100 to maintain the expanding gas 102' at or above a critical point thereof. By way of non-limiting example, to form the gas-expanded solvent 106, the pressure within the vessel 100 may be a range of from about 1070 psi to about 1090 psi and the temperature within the vessel 100 may be in the range of from about 30° C. to about 40° C., more specifically about 35° C.

Dissolving the expanding gas 102' into the polar solvent may cause the gas-expanded solvent 106 to become increasingly nonpolar, decreasing the solubility of the polar impurity in the gas-expanded solvent 106. As the expanding gas 102' dissolves into the gas-expanded solvent 106, the polarity of the gas-expanded solvent 106 decreases to the point where the polar impurities dissolved therein are no longer miscible with the decreased polarity solvent phase. The expanding gas 102' may decrease the solubility of the polar impurities in the polar solvent by disrupting hydrogen bonding and electrostatic interactions in the polar solvent.

Figure 3:
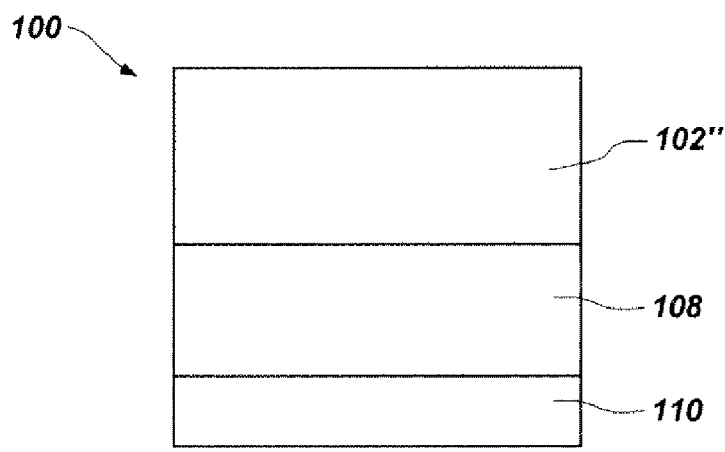

Referring to FIG. 3, as the expanding gas 102" continues to dissolve into the gas-expanded solvent 106 (shown in FIG. 2), the gas-expanded solvent 106 becomes increasingly non-polar forming a solvent-rich fluid phase 108. By further increasing the pressure, the solvent may begin to dissolve from the gas-expanded solvent 106 (FIG. 2) into the expanding gas 102" causing the solvent-rich fluid phase 108 and the expanding gas 102" to form a single supercritical phase (not shown) in which the polar impurities are substantially immiscible. As the supercritical phase forms, the polar impurities drop out of solution forming a polar impurity-rich fluid volume 110.

By way of non-limiting example, to form the solvent-rich fluid phase 108, the pressure within the vessel 100 may be a range of from about 1090 psi to about 1120 psi, more specifically about 1117 psi, and the temperature within the vessel 100 may be in the range of from about 30° C. to about 40° C., more specifically about 35° C. The pressure may be increased by introducing additional expanding gas 102" into the vessel 100. The solvent-rich fluid phase 106 may be in an expanded liquid phase, a near critical liquid phase, or a supercritical phase. The resulting polar impurity-rich fluid volume 110 may have a substantially increased concentration of polar impurities and a decreased solvent concentration. The polar impurity-rich fluid volume 110 including the polar impurities may be removed from the vessel 100 by conventional techniques such as by liquid-liquid separation or gravity separation. The concentrated polar impurities in the polar impurity-rich fluid volume 110 may be reacted with methanol in a separate, acid-catalyzed reaction to produce biodiesel. Additionally, the concentrated polar impurities may be discarded or sold as brown grease. The resulting gas-expanded solvent 108 may be substantially free of the polar impurities.

Figure 4:
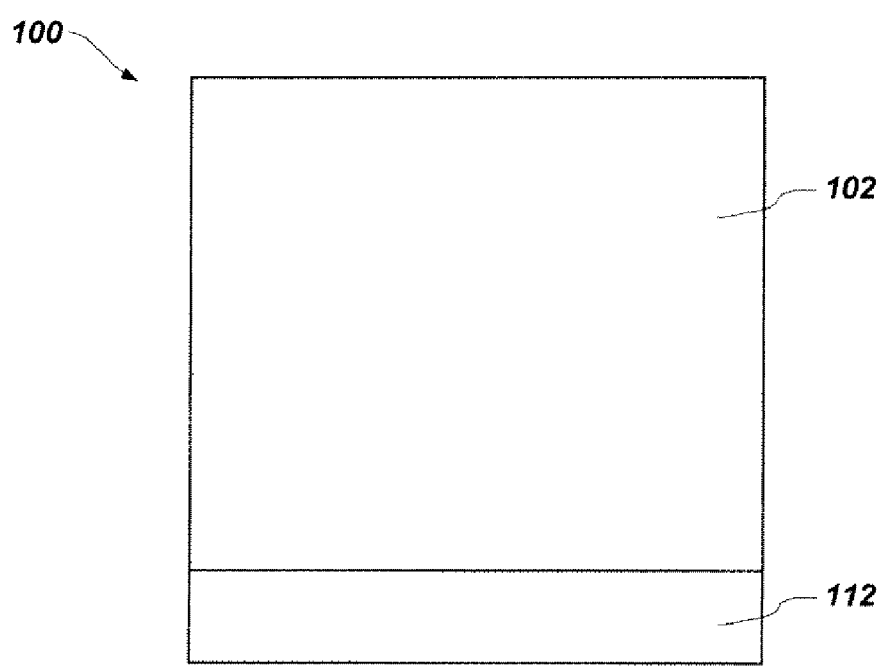

As shown in FIG. 4, after removal of the polar impurity-rich fluid volume 110, at least one of the pressure and the temperature within the vessel 100 may be decreased such that the solvent 112 and the expanding gas 102 become substantially immiscible in one another, causing them to separate into two phases. By way of non-limiting example, a decrease in pressure in a range of from about 10 psi to about 30 psi within the vessel 100 may cause the solvent 112 and the expanding gas 102 to separate into two substantially immiscible phases. For example, where the expanding gas 102 is carbon dioxide, the pressure may be reduced to a pressure of less than about 1117 psig at a temperature of at least about 35° C. The solvent 112 may form as a liquid phase and the expanding gas 102 may form as a gas phase. The polar solvent 112 may be substantially free of polar contaminates, such as free fatty acids. The polar solvent 112 may be removed from the vessel 100 by conventional techniques, such as by gravity separation. The substantially pure polar solvent 112 may be recycled for use in extracting polar impurities from a feedstock in biodiesel production.

Additionally, a decrease in temperature in a range of from about 5 to about 30° C. within the vessel 100 may cause the solvent 112 and the expanding gas 102 to separate into two substantially immiscible liquid phases. For example, where the expanding gas 102 is carbon dioxide, the temperature may be reduced to less than about 25° C. at a pressure of about 1120 psi. The solvent 112 may be a polar solvent and may form as a polar liquid phase and the expanding gas 102 may form as a non-polar liquid phase or gas phase. The solvent 112 may be substantially free of polar contaminates, such as free fatty acids. The polar solvent 112 may be removed from the vessel 100 by conventional techniques, such as by gravity separation. The substantially pure solvent 112 may be recycled for use in extracting polar impurities from a feedstock in biodiesel production and the expanding gas 102 may be recycled for use in separating polar impurities from the solvent.

Figure 5:
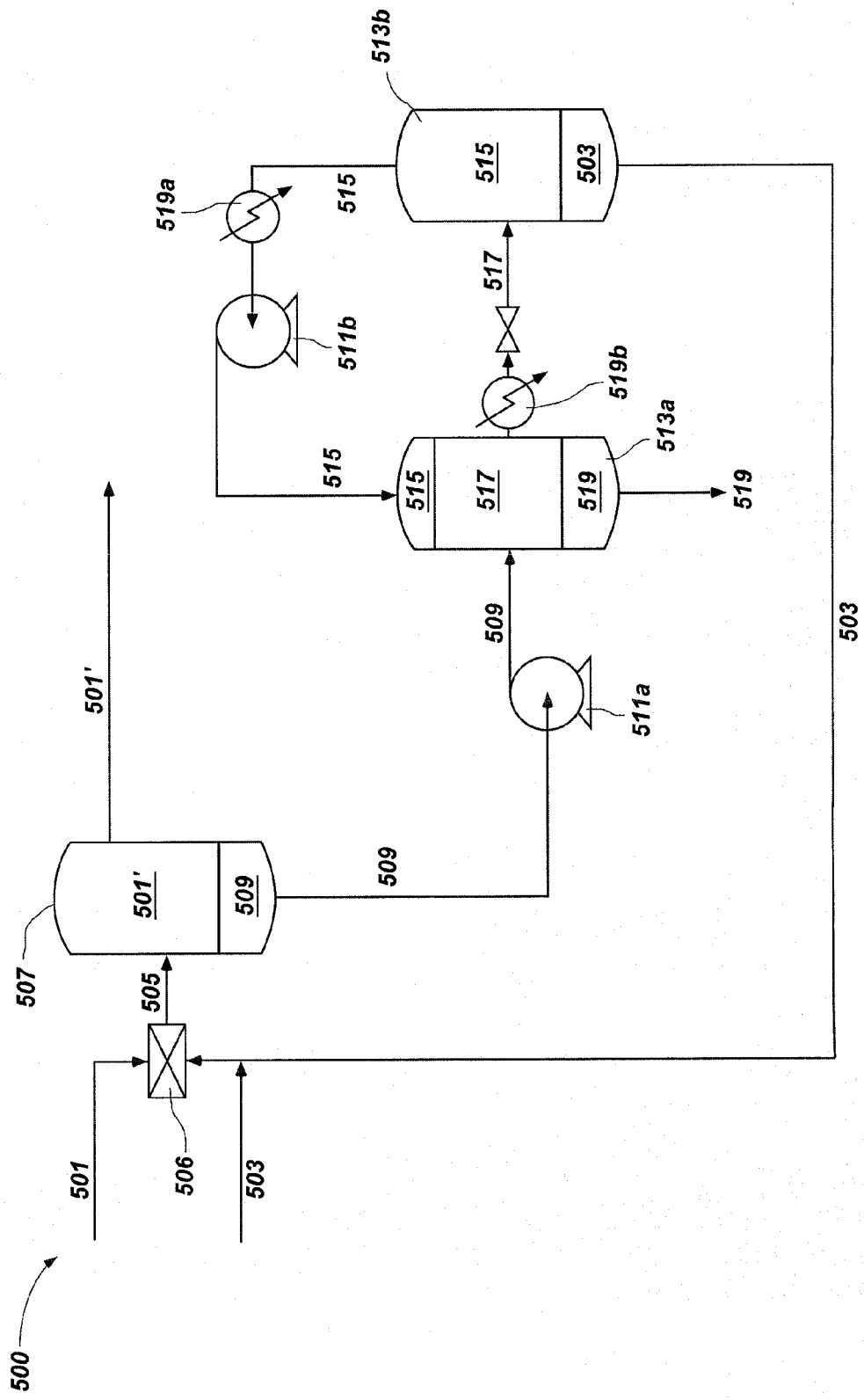
FIG. 5 is a schematic illustration of an embodiment of a continuous flow process for removing polar impurities from a solvent.

FIG. 5 illustrates a continuous flow system 500 for recovering a solvent contaminated with at least one polar impurity. In the continuous flow system 500, a feedstock 501 may be combined with a solvent 503 to form a fluid stream 505 by way of a mixing device 506. The feedstock 501 may be, for example, a fat or oil including free fatty acids and triglycerides. Additionally, the polar impurity may be, for example, a phospholipid, a sterol, water, dirt, a detergent, or a mixture thereof. As a non-limiting example, the solvent 503 may be a polar solvent, such as methanol. The fluid stream 505 is passed into a vessel 507 wherein the polar impurities dissolve into the solvent from the feedstock volume to form a fluid stream 509 that may be removed from the vessel 507 using a conventional technique, such as gravity separation. The triglycerides remain in the feedstock 501' and may be utilized in a transesterification reaction to convert triglycerides to alkyl esters.

The fluid stream 509 may be directed into a phase separating vessel 513a at a desired pressure by way of a pump 511a, or any other suitable device. An expanding gas 515 may be introduced into the phase separating vessel 513a at desired pressure and temperature. The temperature of the fluid stream 509 and the expanding gas 515 may be adjusted prior to entering the phase separating vessel 513a or may be adjusted within the phase separating vessel 513a. The expanding gas 515 may be recycled from within the continuous flow system 500 by way of a pump 511b. By way of non-limiting example, a heat exchange device 519a may be utilized to heat the expanding gas 515 to a desired temperature prior to introducing the expanding gas 515 to the phase separating vessel 513a. Within the phase separating vessel 513a, the solvent from the fluid stream 509 may dissolve into the expanding gas 515 to form a gas-expanded solvent 517 with decreased polarity. Formation of the gas-expanded solvent 517 may result in immiscibility of the polar impurities therein. The polar impurities may drop out of solution forming a polar impurity-enriched stream 519 as a lower layer in the phase separating vessel 513a that may be continuously removed. The pressure and temperature may be increased so that the gas-expanded solvent 517 is near or above a critical point. As a non-limiting example, the expanding gas 515 may be carbon dioxide and the pressure within the phase separating vessel 513a may be at a range of from about 1090 psi to about 1120 psi, more specifically about 1117 psi, and the temperature within the phase separating vessel 513a may be in the range of from about 30° C. to about 40° C., more specifically about 35° C. As a non-limiting example, free fatty acids in the polar impurity-enriched stream 519 may be reacted with methanol in a separate, acid-catalyzed reaction to produce biodiesel or may be discarded or sold as brown grease (not shown).

The resulting gas-expanded solvent 517 may form as an upper layer and may be substantially free of polar impurities, such as free fatty acids. The gas-expanded solvent 517 may be directed to another phase separating vessel 513b. Another heat exchange device 519b may be employed to decrease, maintain, or increase the temperature of the gas-expanded solvent 517. At least one of the temperature and pressure may be adjusted so that the solvent 503 and the expanding gas 515 become immiscible in one another, causing the expanding gas 515 to come out of solution forming an upper layer including the expanding gas 515 and a lower layer including the solvent 503. By way of non-limiting example, a decrease in pressure in a range of from about 10 psi to about 30 psi within the vessel may cause the solvent 503 and the expanding gas 515 to separate into two substantially immiscible phases. For example, where the expanding gas 515 is carbon dioxide, the pressure may be reduced to a pressure of less than about 1117 psig at a temperature of at least about 35° C. Alternatively, by way of non-limiting example, a decrease in temperature in a range of from about 5° C. to about 30° C. within the another phase separating vessel 513b may cause the solvent 503 and the expanding gas 515 to separate into two substantially immiscible liquid phases. For example, where the expanding gas 515 is carbon dioxide, the temperature may be reduced to less than about 25° C. at a pressure of about 1120 psi.

Where the solvent 503 is a polar solvent, such as methanol, the solvent 503 may form as a polar liquid phase and the expanding gas 515 may form as a gas, a supercritical fluid, or a non-polar liquid phase by modifying at least one of the pressure and temperature as previously discussed. The solvent 503 may be substantially free of polar contaminates, such as free fatty acids. The solvent 503 may be removed from the another phase separating vessel 513b by a conventional technique, such as by gravity separation. The substantially pure solvent 503 may be recycled for use in extracting the polar impurities, such as free fatty acids, from the feedstock 501 in continuous flow process 500.

The following example serves to illustrate embodiments of the present invention in more detail. This example is not to be construed as being exhaustive or exclusive as to the scope of this invention.

Example

The separation of free fatty acids from a feedstock using polar solvent extraction followed by recovery of the polar solvent from the free fatty acids using a gas antisolvent was performed. Methanol was used as the polar solvent to extract free fatty acids from the feedstock based on its affinity to attract polar free fatty acids from nonpolar triglycerides that make up the balance of the feedstock. Additionally, since methanol is conventionally used in biodiesel production reactions, methanol was used as the polar solvent to prevent the introduction of additional impurities into the biodiesel production process.

A high free fatty acid oil was simulated by mixing known quantities of soybean oil and oleic acid. The soybean oil has a high concentration of triglycerides, while oleic acid is a free fatty acid that would be found in degraded soybean oil. The soybean oil used in the extraction experiments was commercially obtained from ICN Biomedicals (Costa Mesa, Calif.), while oleic acid and methanol were commercially obtained from Sigma-Aldrich (St. Louis, Mo.).

Extraction was performed using a high free fatty acid oil mixture with a composition of 30% by volume oleic acid in soybean oil (29 wt % oleic acid in soybean oil). A series of extractions were performed in which methanol was used to extract oleic acid from the high free fatty acid oil mixture.

Expansion of a 50% by volume oleic acid in methanol (53 wt % oleic acid in methanol) solution was performed at a constant temperature of 35° C. The experiment was performed in a constant volume 3 mL cell fitted with a quartz window to allow visual observation. Pressure of carbon dioxide introduced into the cell was controlled using an ISCO Model 100DX Syringe Pump controlled by an ISCO Series D Pump Controller, both commercially available from Isco, Inc. (Lincoln, Nebr.) or an HiP Model 87-6-5 manually operated pressure generator, commercially available from High Pressure Equipment Company (Erie, Pa.). An oleic acid and methanol mixture volume of 0.5 mL was used.

Figure 6:
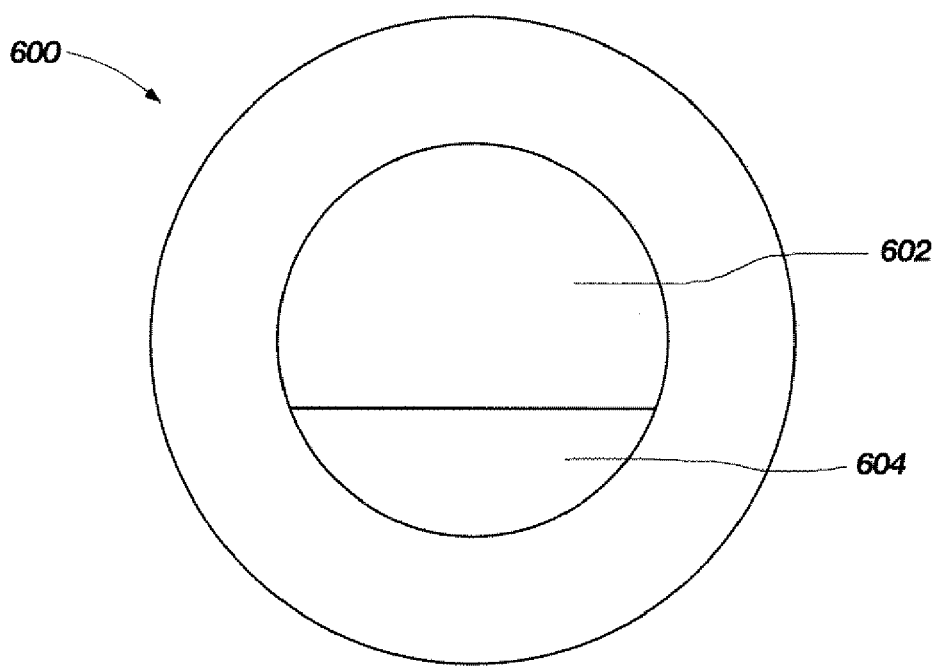
FIGS. 6-9 are schematic illustrations of an embodiment of a method for recovering methanol contaminated with oleic acid using carbon dioxide as an expanding gas.

FIGS. 6-9 illustrate the change in volume of the oleic acid and methanol mixture as the pressure within the cell 600 was increased. As shown in FIG. 6, following solvent extraction of oleic acid from a mixture of oleic acid in soybean oil using methanol, at a pressure of 1090 psi, carbon dioxide 602 is dissolved in the fluid volume 604 so that the fluid volume 604 has expanded substantially in comparison to when the cell 600 is at atmospheric pressure. When the system was at a pressure of 1090 psi, the carbon dioxide 602 and the fluid volume 604 were present in separate, immiscible phases.

Figure 7:
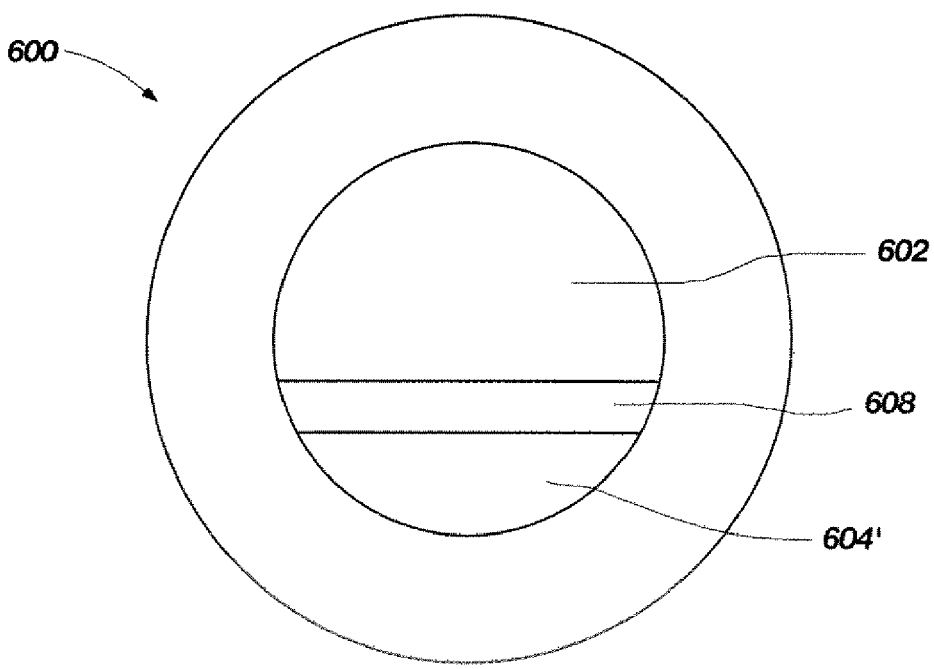

Referring to FIG. 7, increasing the pressure within the cell 600 to about 1100 psig caused a methanol-rich phase of gas-expanded solvent 608 to form. The volume of the fluid volume 604' was reduced as the methanol was expanded by the carbon dioxide 602. The methanol-rich phase of gas-expanded solvent 608 became more non-polar and increased in volume, while the fluid volume 604' became increasingly concentrated with oleic acid.

Figure 8:
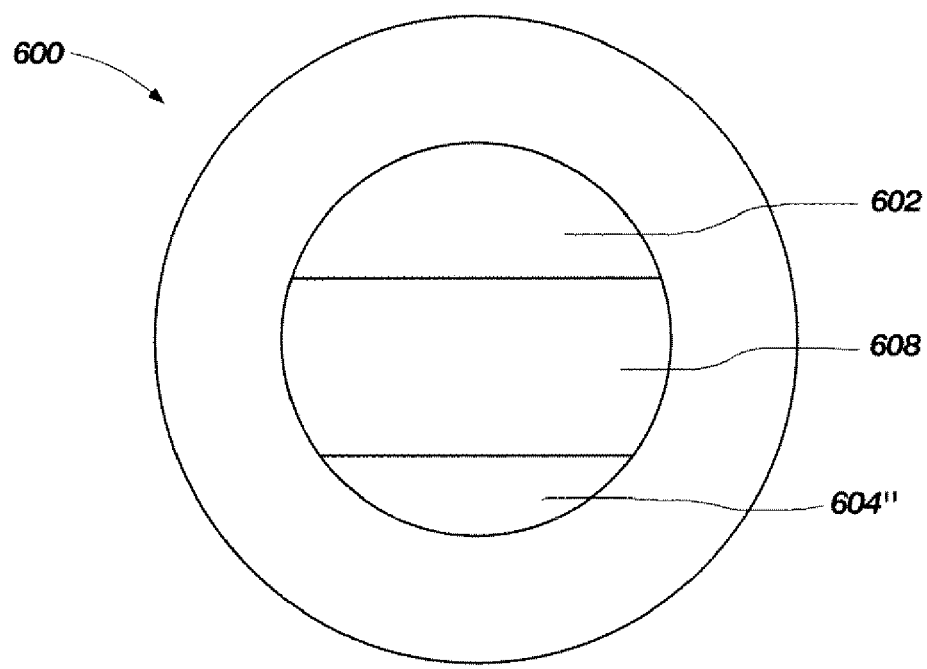

Referring to FIG. 8, as the pressure within the cell 600 was increased to about 1109 psig, the methanol-rich phase of gas-expanded solvent 608 increased in volume and the fluid volume 604" decreased in volume.

Figure 9:
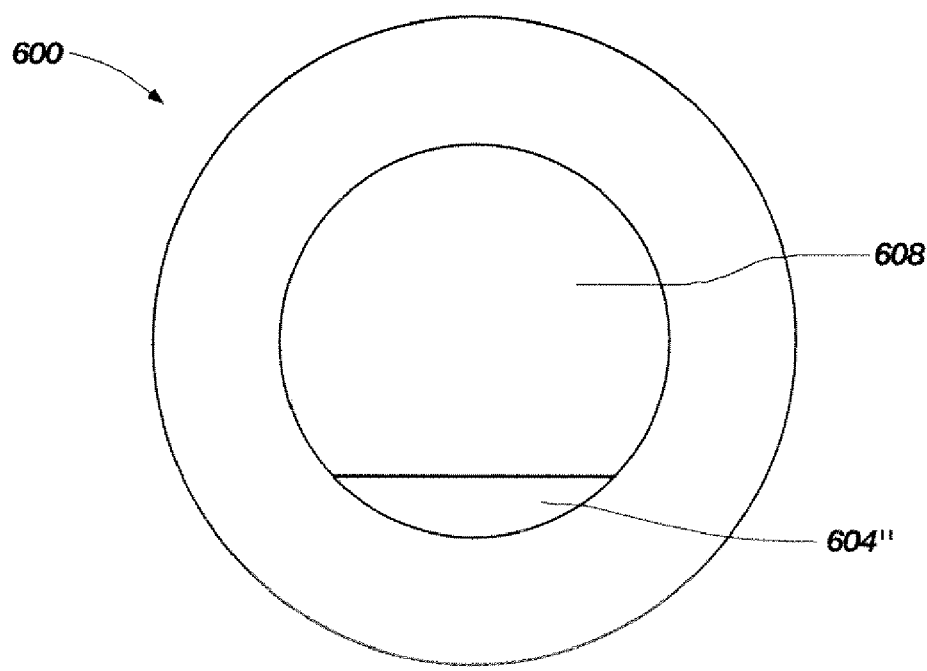
Figure 10:
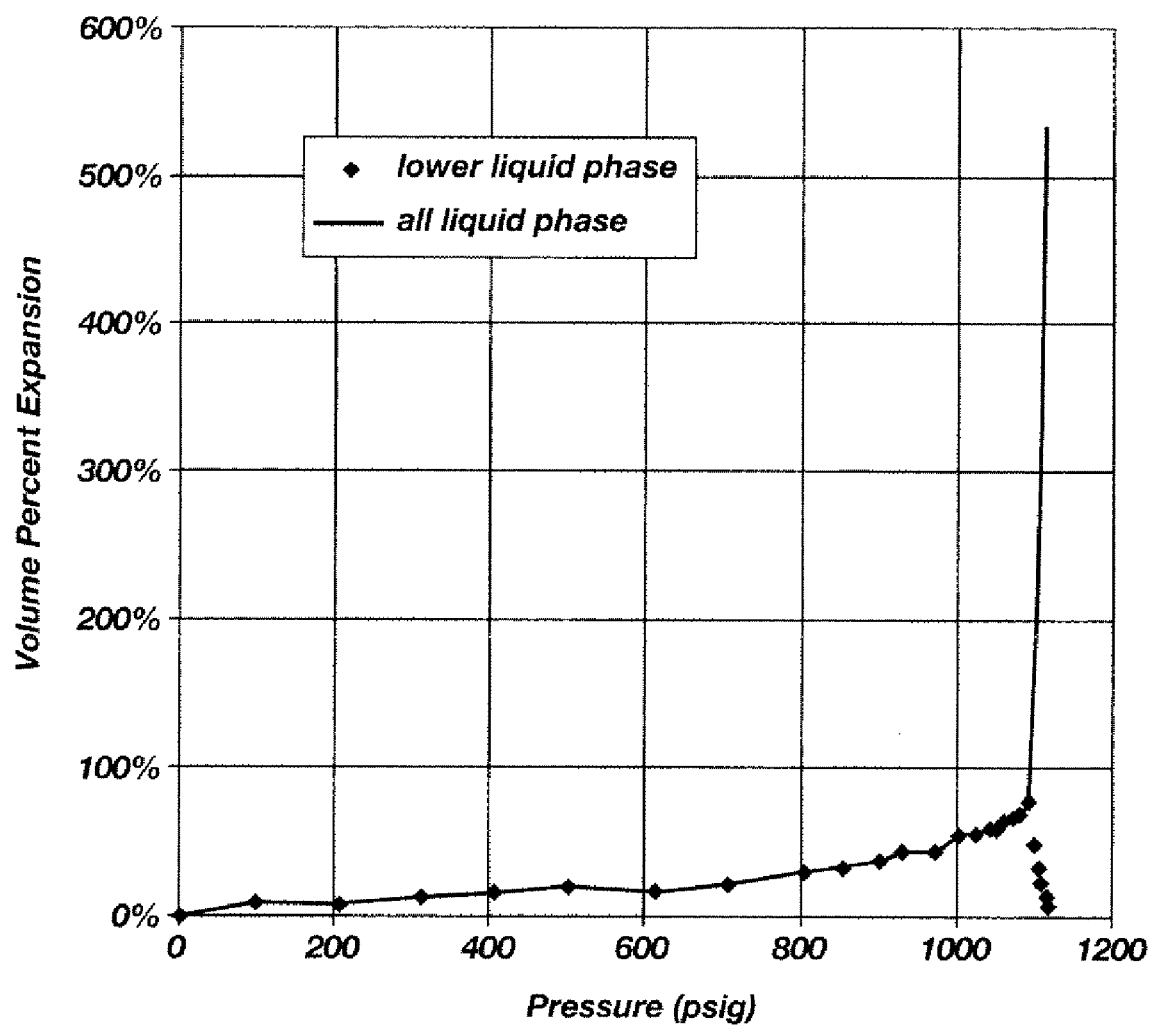
FIG. 10 is a plot showing fluid volumes as a function of pressure according to the embodiment shown in FIGS. 6-9.

As shown in FIG. 9, at a pressure of 1117 psig, the carbon dioxide was substantially dissolved in the methanol of the gas-expanded solvent 608 substantially filled an upper portion of the cell 600. The oleic acid had dropped out of solution with the methanol such that an oleic acid rich fluid volume 604''' was present in a lower portion of the cell 600. A plot of the fluid volume expansion as a function of cell pressure is provided in FIG. 10.

Samples of the gas-expanded solvent 608 and fluid volume 604''' were taken at 1117 psig. The relative concentrations of oleic acid and methanol in the samples were determined using a conventional gas chromatography technique. Expansion of the oleic acid and methanol solution resulted in a fluid volume 604''' with an oleic acid concentration of about 77 wt % and a methanol concentration of about 23 wt %. The presence of oleic acid in the polar solvent that has been exposed to the gas-expanded solvent process was not detected using the gas chromatography technique, indicating that the gas-expanded solvent 608 was substantially free of oleic acid. Thus, a change of less than 20 psig in total system pressure resulted in decreased solubility of the oleic acid in the methanol, leading to the formation of two liquid phases; a concentrated oleic acid liquid phase and a substantially pure methanol liquid phase.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention encompasses all modifications, variations and alternatives falling within the scope of the invention as defined by the following appended claims and their legal equivalents.

What is claimed is:

1. A method of recovering a solvent from a contaminated fluid volume, comprising:
    extracting at least one polar impurity from a feedstock into a solvent to form a fluid volume comprising the solvent and the at least one polar impurity;
    separating a nonpolar component of the feedstock from the fluid volume;
    subjecting the fluid volume without the nonpolar component to an expanding gas at a pressure at or near a critical point thereof;
    dissolving the expanding gas in the solvent to form a gas expanded solvent such that the at least one polar impurity becomes substantially immiscible in the solvent and separates therefrom; and
    reducing at least one of the pressure and a temperature of the expanding gas to recover the solvent.

2. The method of claim 1, wherein extracting at least one polar impurity from a feedstock comprises extracting at least one free fatty acid from an animal fat, animal oil, vegetable fat, vegetable oil, restaurant grease, household grease, waste industrial frying oil, or any mixture thereof.

3. The method of claim 1, wherein extracting at least one polar impurity from a feedstock comprises extracting at least one polar impurity into at least one of methanol, ethanol, n-propanol, isopropanol, n-butanol, isobutanol, and t-butanol.

4. The method of claim 1, wherein dissolving the expanding gas in the solvent to form a gas expanded solvent comprises expanding the solvent with carbon dioxide to reduce the solubility of the at least one polar impurity in the solvent.

5. The method of claim 1, wherein dissolving the expanding gas in the solvent to form a gas expanded solvent comprises expanding a polar solvent with the expanding gas to reduce the solubility of the at least one polar impurity in the polar solvent.

6. The method of claim 1, wherein reducing at least one of the pressure and a temperature of the expanding gas to recover the solvent comprises reducing the temperature of the expanding gas to less than or equal to a critical temperature thereof.

* * * * *